US008533460B2

(12) United States Patent
Hird et al.

(10) Patent No.: US 8,533,460 B2
(45) Date of Patent: Sep. 10, 2013

(54) KEY CAMOUFLAGING METHOD USING A MACHINE IDENTIFIER

(75) Inventors: Geoffrey R. Hird, Cupertino, CA (US); Rammohan Varadarajan, Cupertino, CA (US)

(73) Assignee: Computer Associates Think, Inc., Islandia, NY (US)

( * ) Notice: Subject to any disclaimer, the term of this patent is extended or adjusted under 35 U.S.C. 154(b) by 281 days.

(21) Appl. No.: 12/938,666

(22) Filed: Nov. 3, 2010

(65) Prior Publication Data

US 2011/0113237 A1 May 12, 2011

Related U.S. Application Data

(60) Provisional application No. 61/258,678, filed on Nov. 6, 2009.

(51) Int. Cl.
*H04L 29/06* (2006.01)

(52) U.S. Cl.
USPC .......................................... 713/155; 713/184

(58) Field of Classification Search
USPC ................................................ 713/155, 184
See application file for complete search history.

(56) References Cited

U.S. PATENT DOCUMENTS

| 5,206,905 | A | * | 4/1993 | Lee et al. ........................ 705/55 |
| 6,044,154 | A | * | 3/2000 | Kelly ............................. 713/155 |
| 6,956,950 | B2 | | 10/2005 | Kausik |
| 7,454,782 | B2 | | 11/2008 | Rajasekaran et al. |
| 2002/0073046 | A1 | | 6/2002 | David |
| 2005/0033974 | A1 | * | 2/2005 | Ansell et al. .................. 713/193 |
| 2005/0132031 | A1 | * | 6/2005 | Sailer et al. ................... 709/223 |
| 2006/0020783 | A1 | * | 1/2006 | Fisher ........................... 713/156 |
| 2007/0016941 | A1 | * | 1/2007 | Gonzalez et al. ................. 726/9 |
| 2008/0137861 | A1 | * | 6/2008 | Lindmo et al. ............... 380/270 |
| 2010/0107229 | A1 | * | 4/2010 | Najafi et al. ..................... 726/6 |

FOREIGN PATENT DOCUMENTS

| WO | 2009/025905 A2 | 2/2009 |
| WO | 2009/095263 A1 | 8/2009 |

OTHER PUBLICATIONS

Diego Alejandro Ortiz-Yepes, Enhancing authentication in eBanking with NFC enabled mobile phones, Masters Thesis, Eindhoven University of Technology, 2008.*

PCT Search Report date Feb. 3, 2011 for PCTUS2010/055382 filed Nov. 4, 2010.

* cited by examiner

*Primary Examiner* — Ashok Patel
*Assistant Examiner* — Tracy Mangialaschi
(74) *Attorney, Agent, or Firm* — Quinn Law Group, PLLC

(57) ABSTRACT

A method is provided for generating a human readable passcode to an authorized user including providing a control access datum and a PIN, and generating a unique machine identifier for the user machine. The method further includes modifying the controlled access datum, encrypting the controlled access datum using the PIN and/or a unique machine identifier to camouflage the datum, and generating a passcode using the camouflaged datum and the PIN and/or the unique machine identifier. A mobile user device may be used to execute the method in one embodiment. The passcode may be used to obtain transaction authorization and/or access to a secured system or secured data. The unique machine identifier may be defined by a machine effective speed calibration derived from information collected from and unique to the user machine.

19 Claims, 6 Drawing Sheets

US 8,533,460 B2

KEY CAMOUFLAGING METHOD USING A MACHINE IDENTIFIER

CROSS-REFERENCE TO RELATED APPLICATIONS

This application claims the benefit of U.S. Provisional Patent Application No. 61/258,678, filed on Nov. 6, 2009, which is hereby incorporated by reference in its entirety.

TECHNICAL FIELD

The present application relates to securing access-controlled, computer representable objects, such as software keys, through the use of a camouflaging technique utilizing a unique machine identifier.

BACKGROUND

Symmetric key cryptography is currently used in a secure payment infrastructure to generate a one-time passcode (OTP) that can also serve as a digital signature, using a smart card and dedicated card reader hardware in a two factor authentication process. This method inconveniences the cardholder by requiring the presence of the card reader and smart card to securely host the software and keys used to generate the OTP. In a typical scenario the purchaser inserts her smart card into an unconnected reader with a pinpad, enters a PIN, and reads an OTP off a display. The purchaser types the OTP into a browser web page, or dictates it into a telephone, or otherwise conveys it to an authenticating entity. The smart card and reader are in the possession of the purchaser and are typically carried on the purchaser's person.

The "EuroPay, MasterCard, and Visa" (EMV) consortium, which develops and maintains global standards for credit and debit payment cards based on chip card technology has defined a standardized smart card, referred to as "Chipcard" to work within the EMV 3-D Secure payment infrastructure, with standardized smart card readers, cryptograms, etc. EMV Chipcards use symmetric key cryptography for signing and authentication. In an EMV system, the provisioning server and the authenticating server each have a copy of a Triple Data Encryption Standard (Triple-DES) "Master Derivation Key" or "MDK" in hardware. For each user, the user is identified by a Primary Account Number (PAN), the provisioning server applies the MDK to the PAN and the PAN Sequence Number and generates two symmetric DES keys, which are referred to as Unique DEA Key A (UDKA) and a Unique DEA Key B (UDKB), which go into the Chipcard for that user. Note that the authenticating server can regenerate UDKA and UDKB at any time, using the user PAN information and the MDK.

Cryptographic or secure signing is possible with symmetric keys, such as the DES keys UDKA and UDKB, when the end user (through the UDKA and UDKB in the Chipcard) and the provider system (through the MDK in the provisioning and authenticating server hardware) have access to the user's symmetric key(s). Therefore, the security of the EMV system is based on the security of the authenticating and provisioning servers, the security of the Chipcard, and the secure use of the Chipcard with the card reader.

During a purchase sequence, if the user submits the right PIN to the user's Chipcard, the keys UDKA and UDKB will be available for use inside the card. If the user submits several wrong PINs in a row, the card locks. The Chipcard typically collects transaction information and a random number from the server, and generates a cryptogram, called an Authorization Request Cryptogram (ARQC). The ARQC is digitally "signed" by the two DES keys (UDKA and UDKB) in the Chipcard. The data and the ARQC are sent through the card reader, which is attached to the network, to the authenticating server. The authenticating server recreates the cryptogram, and if it matches the ARQC from the client, the purchase is approved. In some systems, purchase approval may also be subject to some other checks, which may include checks of data elements inputted to the signing algorithm. The application transaction counter (ATC) is incremented on the client, e.g., the Chipcard, and the server, and the server stores the counter in a database.

In a variant on this, a passcode generating system is available in which the smart payment card is used with a disconnected reader that does not communicate with a network during an online or telephone purchase. The stand-alone reader is typically pocket-sized and has a pin pad and an LCD display. The purchaser/user/cardholder inserts the smart payment card into the reader, and inputs a correct PIN via a pinpad on the reader. An ARQC is generated in the card, but the full ARQC, which is binary, is not displayed to the user. Instead, an OTP is constructed using binary bits from the ARQC and other data elements on the card. The OTP is a decimal number of a manageable size for a human (typically 6 to 9 digits). The user views the OTP and manually types it into a web form, telephone pinpad, or speaks it during a CNP purchase or payment transaction. The authenticating server regenerates the cardholder's OTP and compares the OTP provided by the user with the regenerated OTP. Upon matching, the server authorizes the purchase transaction. In both the case of the connected card reader and disconnected reader, an ATC is incremented on the client, e.g., the card reader, and the server. The ATC is incremented each time to ensure a fresh passcode and guards against certain types of attacks, for example, a replay attack. However, the client ATC and the server ATC can get out of synchrony, inconveniencing the client by locking the card and/or card reader until the client ATC and server ATC is resynchronized, where resynchronization may require reissuance of the Chipcard and/or the card reader to the cardholder.

Visa Dynamic Passcode Authentication (DPA) and MasterCard Chip Authentication Protocol (CAP) are two initiatives (among others) derived from the EMV Chipcard specification to implement the variant just described. The EMV Chipcard user is inconvenienced when completing a transaction by the need to use a card reader either connected to the provider system or an online computer, or to use a disconnected handheld unit which must be carried by the user. In the latter case, a separate handheld unit may be required for each Chipcard type or provider. Other potential disadvantages include client-server ATC nonsynchrony and locked Chipcards resulting from incorrectly inputted PIN attempts.

SUMMARY

Certain advantages can be realized by providing the ability to securely host a software client, e.g., a one-time passcode (OTP) generating application on a variety of user handheld devices, e.g., iPhone™, Blackberry™, etc., on a user machine such as a desktop, laptop, notebook, netbook or other computing device, or in JavaScript within a browser. Advantages include increased user convenience, for example, by not requiring network connectivity and/or a dedicated card reader to complete a transaction, and increased ease of resetting the ATC if out of synchrony. An additional layer of security can be provided where the software client is further protected using a machine derived identification parameter which is unique to the user device or machine used to host the software client (OTP generating application), such that the OTP generating software client is configured to be associated exclusively with the hosting user device.

A method is described herein to camouflage the keys and/ or secrets, seeds or other controlled datum used in OTP generating algorithms to enable the ability to securely host the software client (OTP generating application) on a variety of user handheld devices (iPhone, Blackberry, etc.) and in JavaScript within a browser used by a desktop computer, laptop, netbook, or other Internet accessible computing device, thereby eliminating the need for a separate card reader or other dedicated hardware to protect the OTP generating algorithm and/or keys from attack. The OTP generating software client is further configured to be secured for use exclusively with that unique user device, by incorporating a machine identification parameter derived as a machine effective speed calibration (MESC) in the OTP application and authentication process.

The present method includes generating an OTP using a passcode application on a user device. The generated passcode may be a user OTP for use by the user with a provider account. The provider account may be, for example, an EMV standard Visa or MasterCard debit or credit cardholder account, or a user account with a payment system, a transaction system, an authentication system, a secure access system, or a secure data repository. The method includes providing a client passcode-generating application to a user device, and providing individualized data elements (here called a "cardstring") defined by a provider account to the passcode application. The client uses the cardstring data to generate a user one time passcode (OTP) for the provider account. The cardstring is defined by at least one camouflaged key that is camouflaged with a personal identification number (PIN), a machine effective speed calibration (MESC) or a combination of both.

The method includes collecting fingerprint code (FPC) information from the hosting user device and generating the MESC using the FPC information. An MESC generator may be provided to generate the MESC. The FPC information may be collected using an FPC configured, by way of non-limiting example, to measure a runtime of one or more iterations of a portion of the FPC, or by counting the number of iterations completed by a portion of the fingerprint code in a fixed amount of time. The MESC generator may generate the MESC, by way of non-limiting example, by determining an average or other statistical parameter of a portion of the FPC information, or by applying a clustering algorithm to a portion of the FPC information.

The method may include obtaining an activation code for the provider account and providing the activation code to the passcode application to access a provisioning server using the passcode application, such that the provisioning server generates the cardstring for the provider account in response to the activation code and provides the generated cardstring to the passcode application. Providing the cardstring defined by the provider account includes generating at least one key, wherein the generated key is defined by the provider account. The at least one camouflaged key is camouflaged by modifying the key and encrypting the modified key with the PIN, a machine effective speed calibration (MESC) or a combination of both. The cardstring for the provider account is generated from the camouflaged key.

The method further includes providing the PIN to the passcode application and generating the user OTP on the user device using the passcode application and the cardstring. The method may include providing a data element to the passcode application in addition to or instead of the PIN, prior to generating the user OTP on the user device. The passcode application may use the data element to generate the user OTP. The data element may be the PIN, or the MESC, or a combination of these. The data element may be provided by a provider system as a challenge or the data element may be another data element, for example, transactional information such as the purchase price amount. The user OTP may then be provided to an authenticating server, for example, during a transaction involving the provider account, where the authenticating server is in communication with the provider system through which the provider account is accessed.

The user OTP is evaluated using the authenticating server; and an authorization result is provided to one of the provider system and the user. The authorization result may be, for example, a credit or debit authorization, a payment authorization, a transaction authorization, an authentication authorization, a system access authorization, or a data access authorization, as appropriate to the type of provider account for which the user OTP is generated. Evaluating the user OTP to provide an authorization result may include regenerating the user OTP using the authenticating server, and comparing the regenerated OTP, also referred to as the authenticating OTP, and the user OTP, where, for example, the authorization is granted upon a successful matching of the user OTP and the regenerated OTP. The method may further include incrementing a user OTP counter using the passcode application and incrementing a provider OTP counter using the provider system, wherein the respective OTP counters are compared as a step in evaluating the user OTP during an authorization sequence.

The key may be configured as a symmetric key, a DES key, an AES key, a secret, a secret byte array, a seed, and a controlled datum. In a non-limiting configuration, the cardstring may be configurable as an EMV cardstring, and the key is configurable as one of a UDKA and a UDKB key. In another non-limiting configuration, the cardstring may be configurable as an OTP cardstring, and the key is configurable as a secret configurable to generate one of a HOTP (a standardized counter-based OTP), a TOTP (a time-based OTP), or other OTP.

The method may further include providing a second cardstring to the passcode application, wherein the second cardstring is configured to generate a second passcode configured as a user OTP for a second provider account. The second cardstring may be defined by at least another key camouflaged with one of asecond PIN, a second MESC generated for the user device, or a combination thereof. By providing at least one of the second PIN or the second MESC to the passcode application, a user OTP for the second user account may be generated on the user device using the second cardstring.

A system is also disclosed herein for providing an OTP from a user device. The system can be used with a provider account. The system includes a user device configured to receive a passcode application, a PIN, a FPC, and a cardstring, and further includes a provisioning server configured to provide the cardstring and the passcode application to the user device. At least one of the user device and the provisioning server may be configured to use FPC information collected by the FPC from the user device to generate a MESC. The system may include a MESC generator configured to use the FPC information to generate the MESC.

The user may access the passcode application on the user device which uses the cardstring and at least one of the PIN and the MESC to generate the user OTP for the provider account. The cardstring may be defined by at least one key, wherein the at least one key is defined by the provider account and is camouflaged with the PIN, the MESC, or a combination thereof. The camouflaged key may be configured as a modified key encrypted with the PIN, wherein the key prior to modification is a one of a symmetric key, a DES key, an AES key, a secret, a secret byte array, a seed, a controlled datum, a UDKA key and a UDKB key. The cardstring may be configured as an EMV cardstring or as an OTP cardstring.

The passcode application may be configured to execute at least one passcode generating algorithm configurable to generate one of an EMV OTP, a HOTP, a TOTP, and a counter-based OTP. The passcode application may be configured to receive a data element and to use the data element to generate the user OTP. The data element may be a challenge provided by the provider system, or may be the PIN, the MESC, another data element or a combination thereof. The provider system may include, for example, the provisioning server, a transaction server, and an authentication server. The provider system may provide the functions of the provisioning, transaction and authentication servers on a combined server or on multiple servers in a distributed system. The authenticating server may be configured to receive the user OTP and to provide an authorization result to one of a provider system and the user. The system may further include a user OTP counter which may be incremented by the passcode application, and a provider OTP counter which may be incremented by the provider system.

The above features and advantages and other features and advantages of the present invention are readily apparent from the following detailed description of the best modes for carrying out the invention when taken in connection with the accompanying drawings.

DETAILED DESCRIPTION

Certain advantages can be realized if a one-time passcode (OTP) can be provided to a user without requiring dedicated hardware such as a connected or stand-alone smart card reader to generate the OTP for each of the user's Chipcards or provider accounts. The ability to securely host the software client, e.g., an OTP generating application, on a variety of user handheld devices such as an iPhone or a Blackberry, and in JavaScript within a browser, would increase user convenience, for example, by not requiring network connectivity or a dedicated reader, support OTP generation for multiple smart card accounts on a single device, and increase ease of resetting an ATC if out of synchrony. An additional layer of security can be provided where the software client is further protected using a machine derived identification parameter which is unique to the user device or machine used to host the software client (OTP generating application).

Therefore, the present method can be used to camouflage keys, including symmetric keys, and to securely host the OTP generating software client, including the camouflaged symmetric keys, on a variety of user handheld devices and in JavaScript within a browser used by a desktop computer, laptop, netbook, or other Internet accessible computing device, such that the user device is configurable to securely generate a user OTP. The keys may be camouflaged using a unique machine-derived parameter such as a machine effective speed calibration (MESC). The OTP generating software client is further configured to be secured for use exclusively with that unique user device, by incorporating a machine identification parameter which may be defined by a MESC in the OTP application and authentication process.

Figure 2:
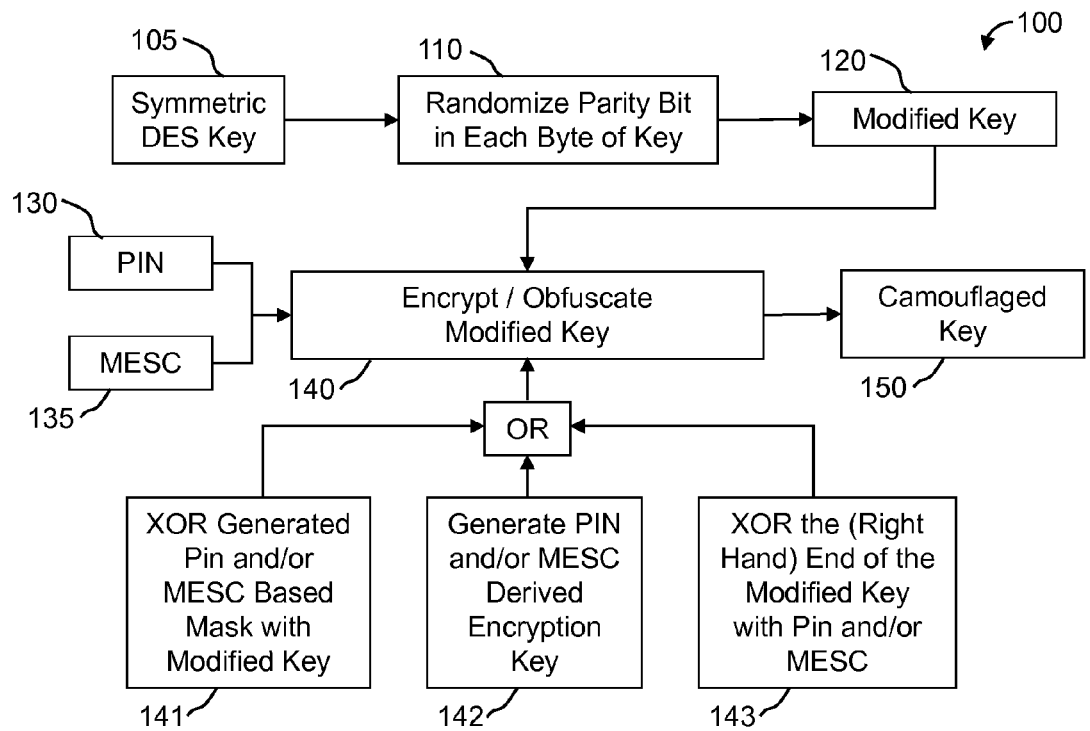
FIG. 2 is a schematic illustration of process of symmetric key camouflaging.

The method and system described herein uses cryptographic camouflaging, as described in the non-limiting example shown in FIG. 2, to secure the symmetric DES keys (UDKA and UDKB) of the EMV method, thereby retaining the two factor strength of the smart card solution without the need for client hardware, such as a POS or Chipcard card reader, to protect the ARQC and OTP generating algorithm. The camouflaging scheme may be configured to provide a plausible key, that is, a key which is different but indistinguishable from a correct key, to an attacker in response to an incorrect PIN input. As a result, an attacker may use this plausible key with a service provider system where the service provider system may be configured to detect input of the plausible, but incorrect key as an intrusion, triggering intrusion detection systems which may result in thwarting or catching the attacker.

The software client, hereinafter also referred to as the OTP generating software or application, or the passcode application, is configurable to run on a variety of handheld devices (iPhone, Blackberry, etc.) and in JavaScript within a browser used by a desktop computer, laptop, netbook, or other Internet accessible computing device. The OTP generating software client includes the OTP generating algorithm, the data elements, which may include the keys and/or secrets used to generate the OTP and may be provided as a cardstring, and a fingerprint code (FPC). The FPC may be used to collect information which is unique to the hosting user device. The cardstring and the FPC may be provisioned together in the passcode application on the user device, as described in further detail herein. The required data elements are stored in the database or file system of the user device, or in a cookie (or Adobe Flash movie) in the case of JavaScript. The passcode application may be configured to further include a MESC generator configured to generate a user machine specific MESC using unique information collected from the user machine by the FPC.

Figure 1:
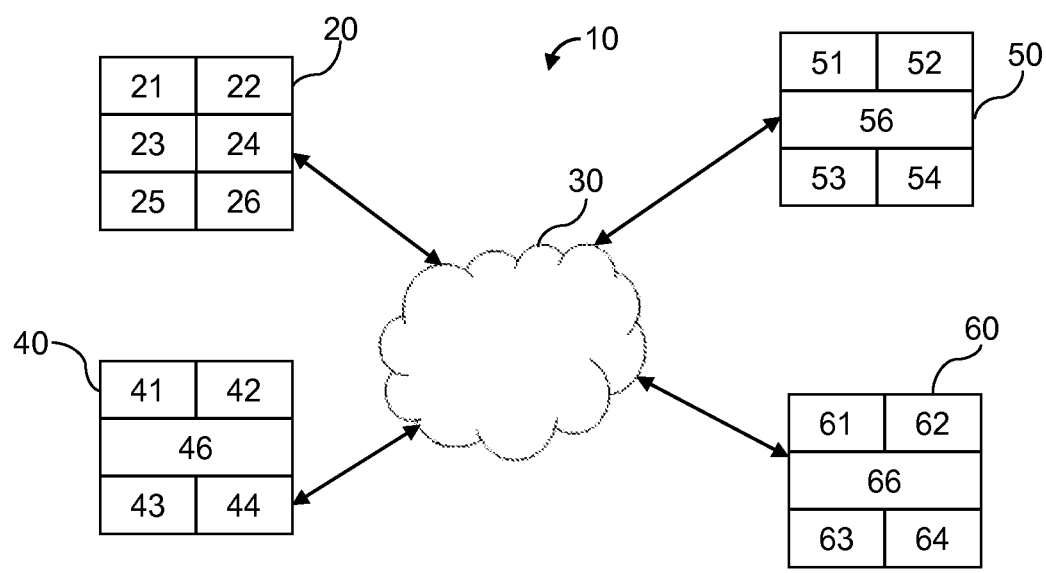
FIG. 1 is a schematic illustration of a system for providing an OTP using a user device.
Figure 3:
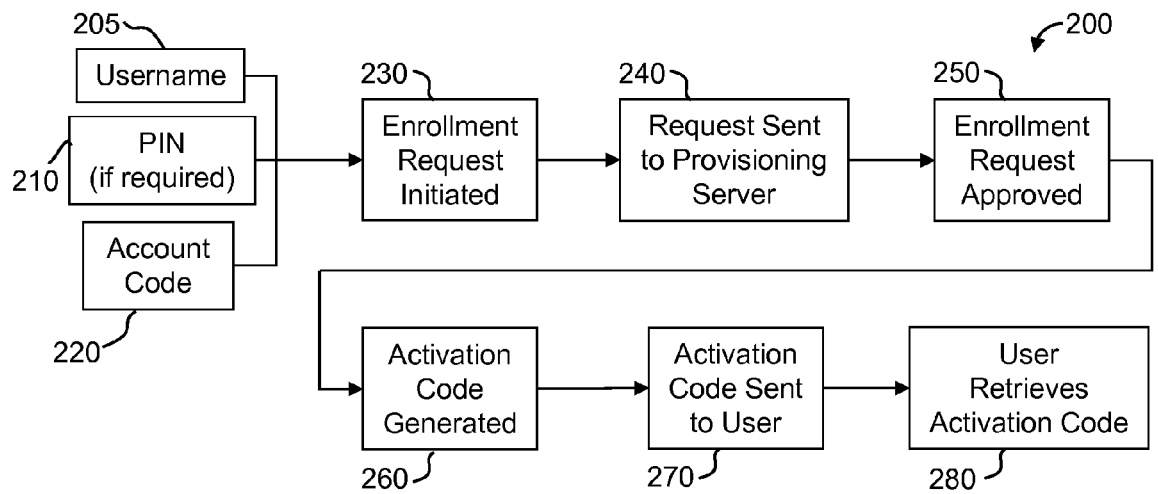
FIG. 3 is a schematic illustration of an activation process.
Figure 4:
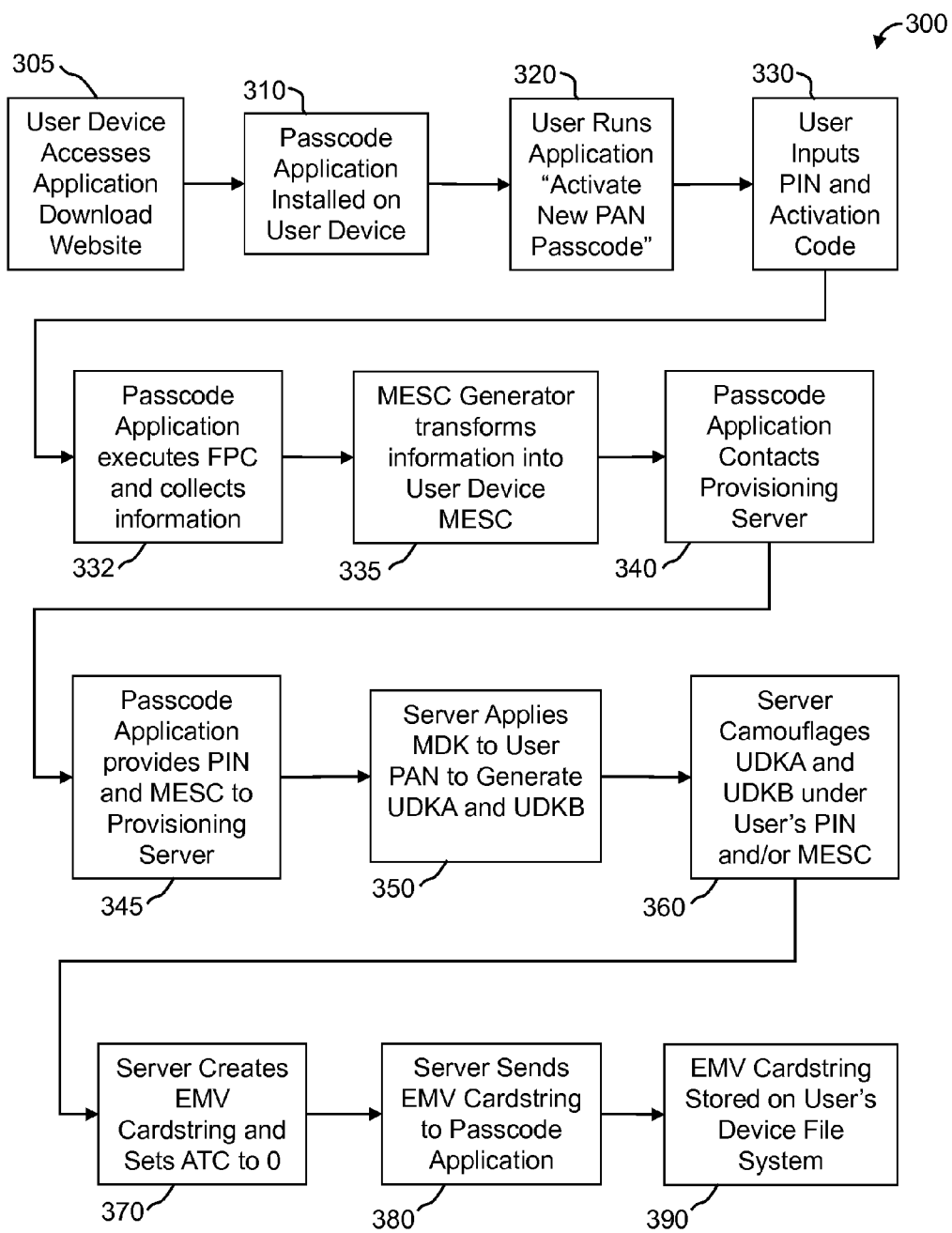
FIG. 4 is a schematic illustration of a process to provide a camouflaged EMV cardstring capable of generating an OTP to a user device.
Figure 5:
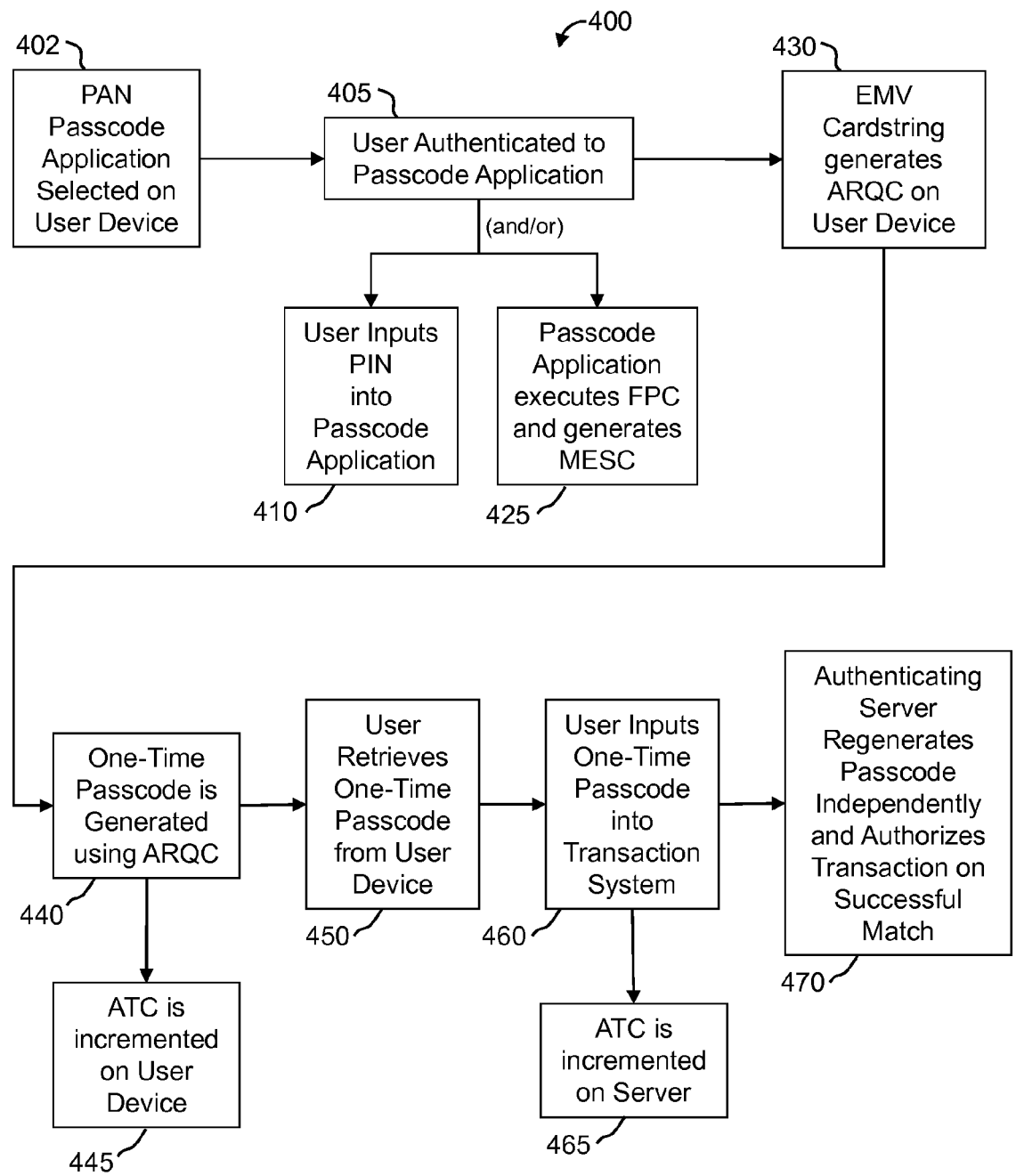
FIG. 5 is a schematic illustration of a process to obtain, from a user device, an OTP to authorize a transaction.
Figure 6:
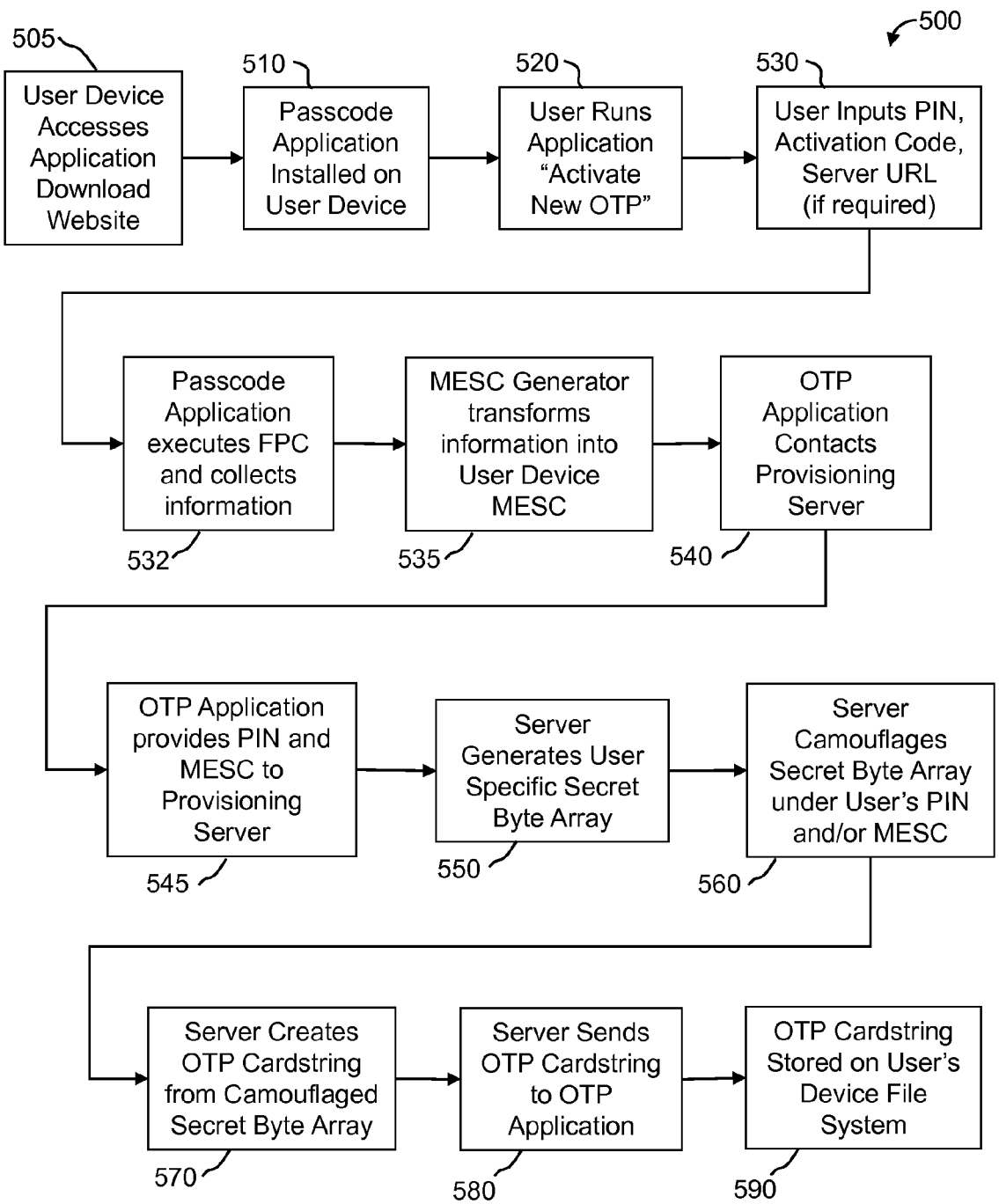
FIG. 6 is a schematic illustration of a process to provide a camouflaged OTP (one time passcode) cardstring capable of generating an OTP to a user device.
Figure 7:
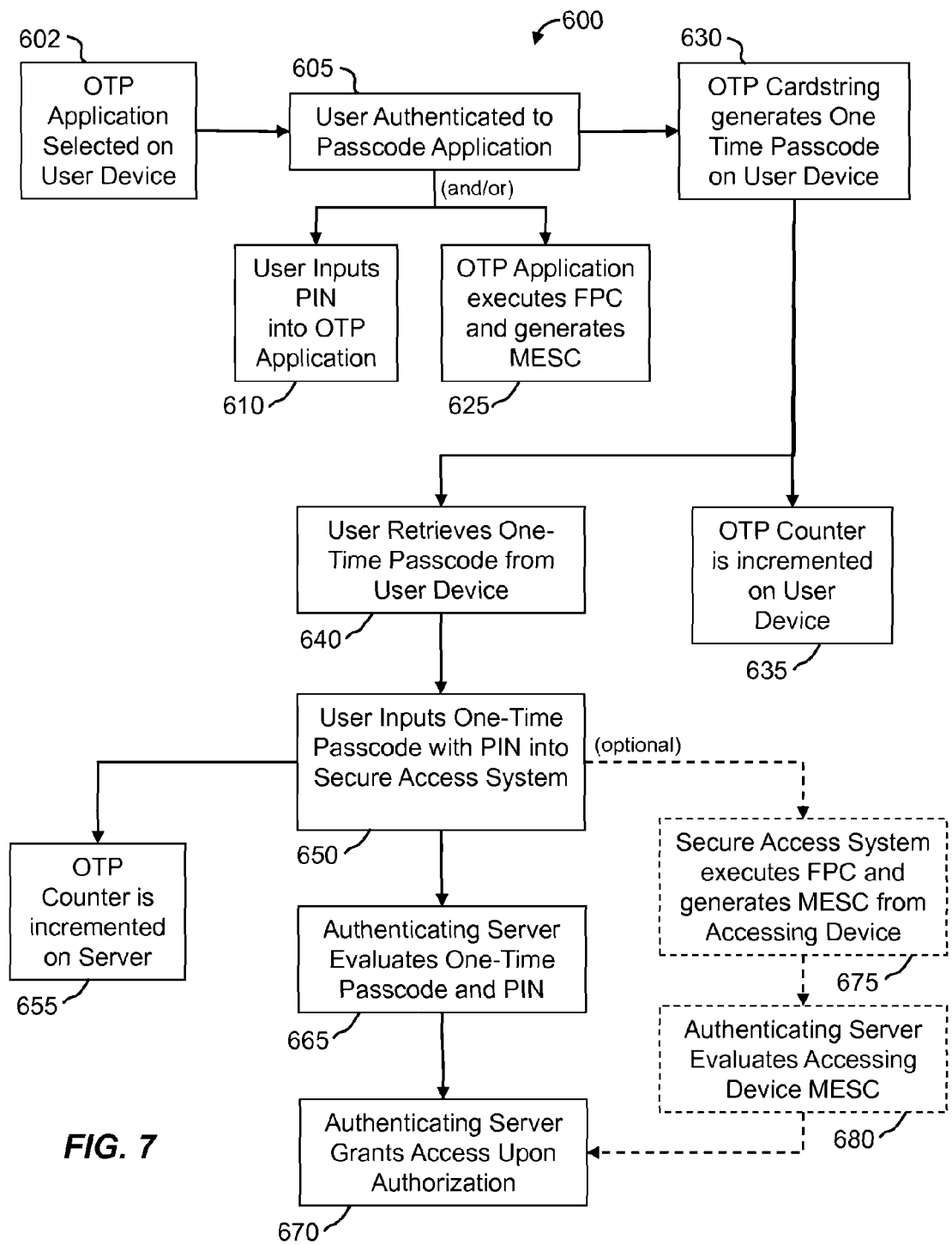
FIG. 7 is a schematic illustration of a process to obtain an OTP from a user device to access a secure system.

The OTP generating passcode application is enabled on the user device through many variant provisioning methods, using, for example, a system configured as system 10 shown in FIG. 1, a camouflaging method shown in FIG. 2, an enrollment method shown in FIG. 3, an activation method shown in FIGS. 4 and 6, a usage method shown in FIGS. 5 and 7, or a combination thereof. For example, in a typical provisioning method, the user/cardholder will install or download the passcode application to a user device without the data elements, wherein the data elements may include, for example, an OTP generating cardstring defined by a camouflaged key or secret which is specific to the user account or card and identifiable thereto. During an activation interaction with a provisioning server, the user will download the data elements including user specific data elements which may be, in a non-limiting example of an EMV standard Chipcard, the UDKA and UDKB for the user's debit or credit card, or in another non-limiting example, a secret byte array specific to a user's provider account for secure access. These individualized data elements are camouflaged using one or more user specific parameters, which may include a user PIN, a unique user device identifier or MESC, or a combination of these, and encoded into a single string, referred to as a "cardstring," which may also be referred to as an EMV cardstring or an OTP cardstring, prior to being provided to the passcode application. The cardstring is typically configured of human-readable ASCII characters. The cardstring data is used with a PIN and the passcode application to generate a user one-time passcode (OTP). The one-time passcode (OTP) may be configured as a decimal number of a manageable size for a human (typically 6 to 9 digits).

When one or more of the data elements defining the cardstring used to generate the OTP are camouflaged using a MESC generated during the passcode application activation sequence using information which is unique to the activating user device, e.g., the account holder's device, the generated OTP cardstring becomes uniquely secured to the activating, e.g., account holder's user machine, thus providing an enhanced level of security. The use of a machine effective speed calibration (MESC) to camouflage data elements used to create the user-specific (account holder) OTP cardstring exploits the uniqueness of the user machine hosting the passcode application including the OTP generating algorithm and the camouflaged cardstring. The MESC is derived from user device information which is derived from, and therefore quantifies, the inherent and unavoidable variability in the manufacturing processes used to produce the components of the user machine.

The method provided herein uses the knowledge that the speed of any machine (computer, netbook, mobile phone, PDA) is unique to that individual machine (computer, mobile phone, PDA). Any two machines that have the same specified speed, e.g., two computers each specified at 3 GHz and identically configured, by way of non-limiting example, will have actual speeds that are different. Therefore, if the same program is run on each of these two machines, the run times will be different.

Accordingly, the time it takes to run a program including a standard piece of code, such as a fingerprint code (FPC) on each machine can be used as a signature for each machine. This machine signature can be transformed into a machine effective speed calibration (MESC) which can be generated to identify a particular (unique) user machine during an initial activation interaction with a server. The server can use the MESC generated for the user machine to camouflage a UDKA and/or a UDKB and create an EMV cardstring, or, to camouflage a key or secret used to create an OTP cardstring. The EMV or OTP cardstring associated with the user device may then be stored in the passcode application installed on that user device.

When the user subsequently requests an OTP from the user device, the method to generate the MESC can be repeated by the passcode application on the user device and the MESC can be provided as a required data element to generate the OTP. The authenticating server will regenerate the OTP independently, using the MESC generated during the activation session, to determine an OTP match for transaction authorization. Alternatively, the authenticating server may generate the MESC from the user device conducting the transaction, and use this transaction generated MESC to determine an OTP match, and/or a match to the MESC generated during the activation session, providing an additional layer of authentication and security.

The MESC is generated using data, e.g., information, collected by a fingerprint code (FPC) which is executed when the user device accesses the passcode application activation website. The FPC collects information during the passcode activation session. The information collected by the FPC may be referred to as the FPC information, and may include, for example, a machine signature, machine information, and other data or information unique to the user device from which the FPC information is collected. The FPC information may further include session information, which may also include browser or interface information, specific or unique to the session during this the FPC information is collected for the user device. The FPC is preferably a light weight and portable client with no footprint, such as JavaScript, Flash or pure Java.

The FPC information collected during the activation session may include user machine information, for example, machine hardware and software configuration, serial numbers and versions; processor speed, memory speed, graphics capabilities, memory latency, actual and relative machine load and power supply characteristics. The machine information may include information regarding multiple independent attributes of the machine and its components. These may include, but are not limited to, attributes and characteristics of the machine processor, memory, hard disk, graphics card, etc.

The machine information may also include machine information resultant from executing the FPC, for example, the runtime of one or more iterations of a portion of the FPC, or the number of iterations completed by a portion of the FPC in a fixed amount of time.

The activation session information may further include information regarding the user interface and version and the provider interface and version, for example the browser type and browser version of the user interface, or the battery power level of the user device. In the event that the user machine is connected through a proxy or gateway server during an online session so as to prevent the machine IP from being visible to the activation, provisioning or authenticating server, the FPC may be configured to create a socket to the proxy or gateway server to detect the machine IP address.

The activation session information collected by the FPC is transmitted to a machine identity generator from the passcode activation website. The machine identity generator, which may be resident on the passcode application, on a (activation, provisioning, authenticating) server or a third party server, transforms a portion of the activation session information to generate a machine identity including a machine effective speed calibration (MESC). Because the machine effective speed calibration is derived using the actual speed characteristics of the particular user machine, and because the actual speed characteristics of the particular machine are the result of a combination of components which are non-identical to another user device due to at the least, the manufacturing variability of each component, the machine effective speed calibration will be unique to that user machine.

A user machine may have more than one MESC, where each MESC may act as a machine signature to uniquely identify the machine. An MESC may be combined with one or more other MESCs, or may be combined with other characteristics, such as machine load or browser type, to create another unique machine identity or signature. An MESC may be calculated by various methods, for example, using the runtime of one or more iterations of a portion of the fingerprint code, or by using the number of iterations completed by a portion of the fingerprint code in a fixed amount of time. As another example, an MESC may be calculated by determining an average or other statistical parameter to a sample group of a characteristic represented in the session information, or applying a clustering algorithm to various elements or characteristics of the session information.

The MESC provides sufficient differentiation such that the machine identity including the MESC is unique to the user machine used during the passcode application activation session. A detailed description of the process and method for generating a machine identity including a MESC follows.

The unique machine information collected by the FPC will include information related to one or more characteristics of the machine which are influenced or modified by variances in the manufacturing process of the elements of the machine from which the characteristic is derived, such as the speed, graphics capabilities or memory latency of a machine. The manufacturing variability of each element produces a distribution or range of performance within the population of elements. Further, the combination of these elements in computers which are built to identical specifications and are of the same configuration produces a wider distribution or range of performance within the population of similarly configured computers.

Therefore, two machines may be identically configured and built to identical specifications, for example, the two machines will each have the same specified speed (e.g., 3 GHz), yet because of variation in the manufacturing processes producing the hardware in the two machines, the actual speed of each of the two machines will be different. Accordingly, if the same program is run on these two machines, the run times will be different for each machine; however the run time of each machine will be repeatable within an extremely narrow band of variation. In general, then, the time it takes to run a standard piece of code on a machine can be used as a signature for each machine. Further, this type of machine signature can be used to determine a machine effective speed calibration (MESC) which will be unique to each machine. Each machine can repeatably generate its MESC, which can be used to match a specific machine to itself by matching the machine's MESC generated at a later time to the same machine's MESC generated at an earlier time. Because each machine will repeatedly generate its unique MESC, the MESC can also be used as a unique machine generated PIN.

Various methods can be used to generate a MESC. By way of non-limiting example, a MESC may be generated using a characteristic of the machine's graphic capabilities. Two machines may be assembled with the same type graphics card, however, due to the manufacturing variability of the processes producing each graphic card, the two machines may differ in their graphics capabilities. For the same standard picture, the display on the two machines may differ such that the screen resolution corresponding to a standard picture could provide a unique machine signature to differentiate one machine from another. Further, the time to load a standard picture on one of the machines may be highly repeatable such that it provides a unique machine signature, or MESC, to identify the machine by comparing a time to load a standard picture on the machine during a subsequent session to the time it took to load the standard picture on the same machine during an earlier session.

In another non-limiting example, the MESC may be the number of iterations made by the FPC in a fixed amount of time (e.g., a second). Another MESC that may be used is the actual time it takes to run the FPC once. This time could be averaged over multiple runs (e.g., 3, 5, 10, etc.).

The unique machine signature, also referred to as a machine identifier, for a machine may consist of the MESC only. Additionally, the MESC could be used in conjunction with other machine information as a machine signature. Alternatively, one MESC can be collected per unit of time. If the machine online (browser) session remains active with the provider interface for n units of time then the n samples could be collected and averaged. The FPC and calibration could be started slightly after the provider interface (webpage, website, passcode application) is loaded (e.g, 100 ms), as shown in steps 332 of FIG. 4, step 425 of FIG. 5, step 532 of FIG. 6 and step 625 and optional step 675 of FIG. 7. The average MESC can then be used as the machine signature. A simple average of n samples of MESC may mask out some information useful to identify the machine in subsequent sessions.

Therefore, in addition to calculating a simple average, the individual values from each of the n samples can be collected and another calculation can be performed to generate a descriptive statistic for the n samples of MESC. For example, the high and low sample values can be removed before averaging the remaining samples, or values with high variation from the average can be ignored in calculating the average, and the modified average MESC can be used as a machine signature or machine identifier. Alternatively, the collected and calibrated data for the machine can be clustered using any clustering algorithm to derive more accurate machine signatures. Other statistically descriptive parameters of the n samples may be used individually or in combination with the MESC to establish a unique machine signature or machine identity.

A machine signature may also consist of an MESC or combination of different MESCs of the machine in conjunction with other of the machine attributes, such as the machine IP address, browser type and version, operating system (OS) type and version, screen settings, locale and language of the machine, battery power level, etc.

In the case of a mobile device running on battery power, such as a laptop, personal digital assistant (PDA), smart phone, notebook, etc., the machine speed may change based on the power supply. For instance, the machine speed may be less when running on a partially charged battery compared to the speed while operating on a fully charged battery or on main power, such as when the machine is connected to an electrical outlet or main power source, through an adapter, for example. This difference may be significant as detected by the calculated or derived MESC. As a result, there is a many to many mapping between the speed and the machine, which must be considered when transforming the collected information into an MESC. The differences arising from this many to many mapping may also be managed as a compensating factor in the process of comparing near identical MESCs generated from mobile machines.

Referring to the drawings, wherein like reference numbers correspond to like or similar components throughout the several figures, there is shown in FIG. 1 a schematic illustration of a system 10 for providing a user OTP using a user device 20. The provider system 10 includes a transaction server or system 40, a provisioning server or system 50, and an authenticating server or system 60, which are each configured to communicate with a network 30, which may be, for example, the Internet.

The user device 20 may be a user device such as a mobile phone, a personal digital assistant (PDAs), a handheld or portable device (iPhone, Blackberry, etc.), a notebook, personal computer, note pad or other user device configured for mobile communications, including communication with network 30. The mobile user device 20 is configured to communicate with the network 30 through an interface 21, which may be a modem, mobile browser, wireless internet browser or similar means suitable for accessing network 30. The user device 20 may be further configured with a passcode application 26 which may include one or more algorithms configurable to generate an OTP using a camouflaged cardstring or other key or secret which may be provided to passcode application 26 or stored in a database or file system 24 on user device 20.

The passcode application 26 may include a fingerprint code (FPC) executable to collect information from and unique to the user device 20. The passcode application 26 may further include a machine effective speed calibration (MESC) generator configured to generate a machine identifier defined by a MESC of the user device 20, using fingerprint (FPC) information collected from the user device 20 using the FPC noted above. The user device 20 further includes a memory 23 and a central processing unit (CPU) 22. The memory 23 of device 20 can include, by way of example, Read Only Memory (ROM), Random Access Memory (RAM), electrically-erasable programmable read only memory (EEPROM), etc., i.e., non-transient/tangible machine memory of a size and speed sufficient for executing one or more algorithms included in the application 26 activated on user device 20 including, for example, one or more OTP generating algorithms, FPCs, and or MESC-generating algorithms. User device 20 is configured to provide an input/output 25 which may be configured, for example, as a keypad and display, a touch screen, or a combination thereof configurable to display, for example, a menu, a generated OTP, a challenge or other information associated with passcode application 26, information input into or received by device 20 such as information provided through or selected from input/output 25.

The transaction server 40 may be configured with interface 41, which may be a modem, browser or similar means suitable for accessing network or internet 30. Interface 41 may be configurable to communicate with one or more authenticating and/or provisioning systems, for example, the provisioning server 50 and the authenticating server 60, through the network 30 or directly without accessing the network 30, where the accessible provisioning and authenticating server(s) 50, 60 may be a hosting system for the transaction server 40 or vice versa.

The transaction system 40 may correspond to or be associated with a provider which may be a bank or other financial institution engaged in issuing, for example, EMV standard Visa or MasterCard debit and/or credit cards and processing payments associated therewith. The transaction system 40, in a non-limiting example, may be a merchandiser or service or utility provider which utilizes EMV standard Visa or MasterCard payment systems to conduct business. In another non-limiting example, transaction system 40 may be a provider of services or transactions which require a user or provider account holder to securely access the provider system, to be authenticated to the provider system, or to provide secure authorization to the provider to conduct transactions.

The transaction server 40 is configurable to communicate with network 30 through a transaction interface 41, for example, a transaction or provider website. The transaction system 40 is configured with a CPU 42 and a memory 43, and may include a passcode application 46 which may be configurable to generate OTPs, keys, secrets or other data elements, which may be stored in a database or file system 44. The passcode application 46 may include a FPC executable to collect information from and unique to a user device, such as the user device 20. The passcode application 46 may further include an MESC generator configured to generate a machine identifier defined by a MESC of a user device, such as the user device 20, using FPC information collected from the user device 20, using the FPC. The memory 43 of system 40 can include, by way of example, ROM, RAM, EEPROM, etc., of a size and speed sufficient for conducting provider transactional, provisioning, authorization and authentication processes or other tasks and processes related to OTP based methods, and for configuring, providing and/or activating algorithms, keys, secrets, and other data elements related to provider accounts, or to the methods and systems described herein.

System 10 may further include a provisioning server 50 which is configurable to communicate with the network 30 through a server interface 51. As discussed previously for the transaction server 40, the provisioning server 50 is configured with a CPU 52, a memory 53 and a database or file system 54. Provisioning server 50 may include a passcode application 56 which may be configured to generate and/or provide activation codes, OTP generating algorithms, fingerprint codes, MESC generating algorithms, secrets, keys, cardstrings, account information and data elements as described herein, and may further be configured to camouflage datums including secrets and keys which may be symmetric keys, using, for example, the camouflaging method as described herein and one or a combination of a user PIN and a user device MESC.

The passcode application 56 may include a FPC executable to collect information from and unique to a user device, such as the user device 20. The passcode application 56 may further include an MESC generator configured to generate a machine identifier defined by a MESC of a user device, such as the user device 20, using the FPC information collected from the user device using the FPC. The memory 53 of the provisioning server 50 can include, by way of example, ROM, RAM, EEPROM, etc., of a size and speed sufficient for conducting provisioning, transactional, authorization and authentication processes or other tasks and processes as described herein.

System 10 may further include an authenticating server 60 which is configurable to communicate with the network 30 through a server interface 61. As discussed previously for server 50, authenticating server 60 is configured with a CPU 62, a memory 63 and a database or file system 64. Authenticating server 60 may include a passcode application 66 which may be configured to generate and/or provide activation codes, OTP generating algorithms, fingerprint codes, MESC generating algorithms, secrets, keys, cardstrings, account information and data elements as described herein, and may further be configured to evaluate and authenticate user OTPs and/or accessing device MESCs, and to independently generate user OTPs and/or user device MESCs for a provider account, for comparison with an inputted user OTP or accessing device MESC, for example, to determine and provide an authorization result, which may be, for example, approval or denial of a payment transaction or request for secure access.

The passcode application 66 may include a fingerprint code (FPC) executable to collect information from and unique to a user device, such as the user device 20. The passcode application 66 may further include an MESC generator configured to generate a machine identifier defined by a MESC of a user device, such as the user device 20, or another accessing device, using FPC information collected from the device using the FPC. The memory 63 of system 60 can include, by way of example, ROM, RAM, EEPROM, etc., of a size and speed sufficient for conducting provisioning, transactional, authorization and authentication processes or other tasks and processes as described herein. It would be understood that the provider system 10 may comprise the transaction server 40, the provisioning server 50 and the authenticating server 60, in communication with each other, or otherwise configured, for example, such that the transaction, provisioning and authenticating processes may be commonly hosted on one or more shared servers.

FIG. 2 shows a schematic illustration of a method 100 to cryptographically camouflage a software key. The software key may be camouflaged under a PIN, a unique user machine identified such as a machine effective speed calibration (MESC), or a combination of both. At step 105, a symmetric key is provided to a camouflaging process. In the non-limiting example shown in FIG. 2, the key provided at step 105 may be of any symmetric key type, for example, the key may be a Data Encryption Standard (DES) key which is provided for camouflaging under a PIN, a MESC, or a combination of these. The DES key is of size 8 bytes. In each byte, bits 2 through 8 are random, and the first bit is a parity bit which is the parity of bits 2 through 8. In step 110, the parity bit in each byte of DES key 105 is randomized, to produce a modified key at step 120. A PIN is provided at step 130, and/or a MESC is provided at step 135, and the modified key is encrypted or obfuscated at step 140 using the PIN, the MESC, or a combination of these to provide a camouflaged key at step 150.

The method of encryption used at step 140 may be one of various methods. By way of example, three possible methods 141, 142, 143 are shown in FIG. 1. Method 141 uses a Mask Generation Function to create a mask from PIN 130 or from MESC 135 and XOR (Exclusive OR) the mask with the modified key 120 to provide a camouflaged key 150. Method 142 encrypts the modified key 120 with a new key derived from PIN 130 or MESC 135 to provide a camouflaged key 150. When using method 142, no padding or other information should be stored that can help an intruder recognize a failed decryption attempt with a wrong PIN or MESC, e.g., a PIN other than PIN 130 or a MESC other than MESC 135. A third possible method 143 provides XOR the (right hand) end of the modified key 120 with PIN 130 or MESC 135 to provide a camouflaged key 150.

While three possible methods are described herein to encrypt or obfuscate a modified key to provide a camouflaged key, those familiar with the art to which this invention relates will recognize various alternative methods and embodiments can be employed for encrypting a modified key to provide a camouflaged key within the scope of the claimed invention. Additionally, each of these methods of camouflaging may be accomplished using a combination of a PIN 130 and a MESC 135, or a layered encryption of the modified key using first one of the PIN 130 and MESC 135 and secondly the other of the PIN 130 and MESC 135.

Note that an attacker using a brute force attack with all possible PINs or MESCs, and with full knowledge of the camouflage algorithm used at step 140, will always produce a validly formatted DES key, except for the parity bits. The attacker has no way of recognizing when the correct PIN 130 and/or MESC 135 has been used. A crucial feature of the method of camouflage described herein is that structure, if any, should be removed from the datum to be encrypted/obfuscated. This applies to the parity bits, in the case of DES keys, as described for the embodiment shown in FIG. 2. However, it is understood that a camouflaging technique based on the method described in FIG. 2, e.g., a combination of modifying a key and encrypting or obfuscating the modified key using a PIN 130 and/or MESC 135 can be used for any other standard symmetric key, for example, an Advanced Encryption Standard (AES) key. It is further understood that a camouflaging technique based on the method 100 described in FIG. 2, e.g., a combination of modification of the structure of the secret or datum with the encryption or obfuscation of the modified secret or datum to provide a cryptographically camouflaged secret or datum can be applied to any type of secret or datum, including a key generated from a seed, where in the latter event, the seed may be camouflaged to secure the datum. Alternatively, it is understood that providing a camouflaged datum or key could include providing a large set of keys, for example, numbering several million, when a PIN 130 or MESC 135 could be used to select a camouflaged key 150 or MESC 135 based, on respectively, a PIN or MESC derived index.

FIG. 3 shows a representative provisioning implementation or enrollment sequence 200. At step 230, a user cardholder or provider account owner initiates an enrollment request with the card issuer or account provider, through a provider interface which may be, for example, the transaction system 40, and/or the provisioning server 50 via, for example, the network 30 described above. The user may initiate the enrollment request at step 230 in person, by telephone, mail or through other suitable methods sufficient to initiate the enrollment request with the provider, and to provide or establish, as required, a username 205, PIN 210 and user account code 220.

The enrollment request is provided to a provisioning server 50 at step 240 via a network 30 or directly, for example, through a provider system such as the transaction server 40 in direct communication with the provisioning server 50. The provisioning server 50 is provided with, or may be required to create a username 205, a PIN 210, and account code 220 associated with the user account. The account code provided at step 220 may be the cardholder's PAN, or Primary Account Number, in the non-limiting example of the EMV Chipcard enrollment sequence shown in FIG. 3. The account code 220 may be a number other than the PAN, as required by the provider specific enrollment system.

At step 250 the enrollment request is approved and the provisioning server 50 generates an activation code at step 260 which is provided as a strong activation code to the user cardholder at step 270 by a secure method, which may be by email, text or short message service (SMS) message, mail, or telephone, for example. The activation code is defined by or identifiable to the user cardholder or the user's provider account. The user retrieves the activation code at step 280, for use in an activation sequence which may be, for example, the activation sequence shown in FIG. 4.

FIG. 4 provides a schematic illustration of an activation sequence 300, to activate the passcode application 26 on a user device 20. The passcode application 26, which may also be referred to as the OTP generating software client, includes a fingerprint code (FPC) and may further include a MESC generator configured to generate a machine identification parameter, such as an MESC, using information collected by the FPC during the activation sequence 300 which is unique to the user device 20. By using the generated MESC, which is unique to the user device 20, to camouflage the data elements encoded into the cardstring used by the passcode application 26, the OTP generating software client of the passcode application 26 can be configured to be associated exclusively with the unique user device 20. As will be described further, the passcode application 26 can be further secured after activation by requiring a generated MESC as the PIN to access the passcode application 26 during use to obtain a one-time passcode.

Beginning with step 305 of FIG. 4, the user cardholder accesses the provider system, for example, by accessing the provisioning server 50 via the network 30 using the provider account owner or cardholder user device 20. (See FIG. 1) At step 310, the passcode application 26 is provided to and installed on the user device 20. The user accesses the installed passcode application 26 at step 320 by selecting "Activate Card Passcode" or "Activate Account Passcode" or similar, from a passcode application menu. The user, at step 330, inputs the PIN, the activation code retrieved in step 280, and the provisioning server URL (if required and not provided by default) to the passcode application 26.

The user device MESC is generated in steps 332 and 335 of FIG. 4. At step 332, the passcode application executes a FPC to collect information which is unique to the user device 20. The FPC according to one possible embodiment may be a lightweight and portable client with no footprint, such as JavaScript, Flash or pure Java. Any lightweight code, including generic code, could be used for the FPC.

The FPC collects FPC information at step 332 from the user machine, generally using one or more of the methods described previously, and transmits the collected information at step 335 to an MESC generator for transformation to a unique machine identifier including a MESC. The MESC generator, which may also be referred to as a machine identifier generator, may be incorporated into the fingerprint code provided to the passcode application, such that the transformation of the FPC collected information may be accomplished on the user device 20, without the need for, or to access, a separate MESC generator, for example, on a provider server or system.

At step 340, the passcode application contacts the provisioning server 50 and provides the user PIN and MESC. The MESC generator provides the unique machine identity, the MESC, to the provisioning server 50 at step 345 for use in camouflaging the UDKA and UDKB. The MESC generator may also be incorporated into the passcode application 26, or may be provided by the provisioning server 50. In the later event, step 340 may precede step 335 and the provisioning server 50 transforms the FPC collected information provided by the passcode application 26 into the MESC for the user device 20.

At step 350 the server 50 applies a provider MDK to the user PAN to generate account specific UDKA and UDKB keys which are individualized to the user's account. The server 50, at step 360, camouflages at least one of the UDKA and UDKB keys under the user's PIN and/or MESC, using, for example, one of the cryptographic camouflaging methods described for FIG. 2.

At step 370, the server 50 encodes the camouflaged UDKA and UDKB keys into a single string referred to as a "cardstring" or as an "EMV cardstring." The server sets the client ATC and the server ATC to 0. At step 380, the server sends the EMV cardstring to the passcode application 26 on the user device 20. At step 390, the passcode application 26 stores the EMV cardstring in the user device file system 24. The activation sequence may further include, for example, updating a menu in the passcode application 26 to display the account OTP generator as a selectable option from the passcode application 26 menu on user device 20.

A usage process 400 to provide a user OTP for an EMV Chipcard is illustrated in FIG. 5. In the non-limiting example shown, the device 20 is configured with the passcode application 26, which is also referred to as an OTP generating application, and the camouflaged EMV cardstring corresponding to the user's Chipcard account has been provided to the user device 20 during the activation sequence shown in FIG. 4. The user, at step 402, selects the passcode application 26 on the user device 20 and if required, selects the account or card for which a user OTP is being requested. The user is authenticated to the passcode application 26 at step 405 according to the configuration of the passcode application 26. In a first configuration of the passcode application 26, the user, at step 410, inputs a PIN through the keypad of the user device 20, which authenticates the user so that the passcode application 26 proceeds to step 430. In a second configuration of the passcode application, the passcode application triggers the execution of a FPC at step 425 to generate the user device MESC. The MESC is used to authenticate the user and the passcode application proceeds to step 430. In a third configuration, both steps 410 and 425 are required to authenticate the user before the passcode application will proceed to step 430.

At step 430, the passcode application 26 uses the PIN and/or MESC and the camouflaged EMV cardstring to generate an ARQC. At step 440, an OTP is generated using the ARQC, and at step 445 the ATC is incremented in the user device file system 24. The user, at step 450, retrieves the OTP from the device 20 and inputs the OTP at step 460 into the transaction system 40, for example, by typing it into a website, a user device, a phone system, or providing it verbally. The provider system 10, upon receipt of the passcode and other inputted information, for example, the user's Chipcard number, which may be the PAN, increments the ATC in the provider system 10 at step 465. The authentication server 60, at step 470, may regenerate the user OTP independently and compare the regenerated OTP with the user OTP generated by the passcode application provided by the user device 20. The regenerated OTP provided by the authenticating server 60 may also be referred to as an authenticating OTP. Upon successful match, the provider system authenticates the user OTP and grants approval and authorization for the payment transaction.

While the embodiment shown in FIG. 5 is for a Chipcard payment transaction using EMV protocol, it is understood that a generally similar system could be used for other transactional processes or authorizing and authenticating systems which may or may not be EMV compliant. It is further understood that the controlled access datum or key which is cryptographically camouflaged and subsequently used to provide the EMV cardstring may be something other than a symmetric key, may be other than a DES or AES key, or may be a non-symmetric key, a secret, or a seed and indexed key list, as described herein.

Other variants of the transaction authorization process shown in FIG. 5 may be used within the method described herein. For example, the passcode application 26, upon receipt of the user PIN and/or MESC and concurrent with a request for an OTP, may contact the authenticating server 60 to request a challenge. The server 50 sends the challenge to the user, by a predetermined process, for example, through an email, as an SMS (short message service) or text message to the user device 20, or via a phone call or voicemail message.

The user retrieves the challenge through appropriate means, and inputs the challenge as a required data element prior to step 430. The OTP generating process may use the challenge in the ARQC generation sequence at step 430, or at the OTP generating step at 440. Optionally, the user may be required, at step 460, to input a different or additional data element, for example, a secondary PIN or the amount of the purchase transaction for comparison in the authentication process at step 470. Alternatively, the user may input a data element which may be configured as a message to the provider system, for example, an alarm or alert code, notifying the server to provide a non-valid user OTP or to terminate all authorization until reactivated, for example, in the event of a stolen user device or a personal security threat to the user.

The user may repeat the enrollment sequence and activation sequence of FIGS. 3 and 4 for more than one Chipcard account or provider account, such that the user may store a plurality of EMV cardstrings for multiple payment cards and PANs, and for payment cards from different issuers or providers, in the passcode application 26 on user device 20, thus eliminating the need for carrying or connecting multiple card readers, or at minimum, a card reader for each major card type (Visa, MasterCard, American Express). The passcode application 26 may be provided with a plurality of passcode generating algorithms. By way of non-limiting example, the passcode application 26 may be provisioned with a passcode generating algorithm configurable to generate a Visa DPA passcode, and another algorithm configurable to generate a MasterCard CAP passcode.

The passcode application 26 on the user device 20 may be provisioned with a plurality of cardstrings, where each respective one of the cardstrings may be configured for a respective one of a plurality of user accounts, e.g., each cardstring may be defined from an account-specific user account, such that each respective cardstring is generated by a specific camouflaged key or secret. The key or secret associated with each account cardstring may be of a different type. For example, a first cardstring useable to generate a user OTP for a first provider account may be derived from a first secret byte array, and a second cardstring useable to generate a user OTP for a second provider account may be derived from and identifiable to a set of UDKA and UDKB keys defined by an EMV payment card. The first cardstring may be used with a HOTP algorithm, and the second cardstring may be used with an EMV algorithm. A third cardstring may be derived from a second secret byte array, however may use the same HOTP algorithm as the first secret byte array to generate a user OTP for the third provider account.

The passcode application 26 on the user device 20 may be provisioned with a plurality of fingerprint codes and/or a plurality of MESC generating algorithms, where each respective one of the FPCs and/or the MESC algorithms may be configured for a respective one or more of a plurality of user accounts. Each respective cardstring will be associated with a PIN, where the PIN for each cardstring may be different, or as selected by the user or otherwise configured, may be the same PIN for additional user convenience. Similarly, the respective FPC and the respective MESC used to generate each respective account specific cardstring may be different. Alternatively, more than one account specific cardstring may use the same FPC to collect FPC information, and/or may use the same MESC generating algorithm. This may be the case, for example, when the accounts using the same FPC and MESC generating algorithm are of the same type, for example, for multiple VISA accounts, where the data elements defining the cardstring for each account, e.g., the account-specific UDKA and UDKB, differentiate one account cardstring from another account cardstring.

The passcode application and methods described herein may be used to generate an OTP to authenticate a user to a provider server or to a provider account, to provide a user OTP to access restricted contents or services or to authorize a transaction, which may be a payment or a non-payment transaction. The passcode application and cardstring may be provisioned to provide a user OTP for user authentication and access authorization, with the strength of two-factor authentication however without the inconvenience of additional hardware such as the RSA keyfob system, or additionally requiring online access to obtain a passcode value. Referring again to FIG. 2, the key which is provided at 105 to be camouflaged in a secured access scenario may be a controlled access datum used in conjunction with the protected server or system, and may be configured other than a symmetric DES key. The controlled access datum provided in step 105 may be a key, a secret, a secret byte array or a seed and indexed key list, for example, or a datum suitable for use with an OTP generating algorithm, such as a HOTP or TOTP algorithm. If the key provided at step 105 were a datum other than a DES key, the datum would be modified such that the structure of the datum would be removed, to provide a modified datum at step 120.

Referring briefly back to FIG. 3, the account code 220 provided to the enrollment sequence for a passcode application configured to provide a user OTP for secure access or authentication may be a provider account code identifying the user to the provider system, server or network, or may be a user account, a user identification number, or, by way of non-limiting example, an employee number for access to a secure employer system.

FIG. 6 illustrates an activation sequence 500 where the system and methods including the passcode application 26 may be configured to generate an OTP configured for secure access or authentication or otherwise configured as a user OTP for use with a non-EMV payment system or other non-EMV provider system. In the non-limiting example shown in FIG. 6, and similar to the activation process as described for FIG. 4, the activation sequence 500 for an OTP generating passcode application 26 on a user device 20 (see FIG. 1) begins at step 505, where the user accesses the provider system, for example, by accessing a provisioning server 50 through the network 30 using the user device 20. The user may provide an authorization code obtained through an enrollment sequence from the provider, using a method such as the method shown in FIG. 3 and described previously.

At step 510, a passcode application 26 is provided to and/or installed on the used device 20. The passcode application 26 may include one or more OTP generating algorithms, which may be configured, for example, as one or more of a HOTP algorithm, a TOTP algorithm, a counter-based algorithm or other Internet Engineering Task Force (IETF) standard algorithm configurable to generate a user OTP for a provider system. At step 520, the user accesses the passcode application 26 on the user device 20, and if required selects a provider account for which a user OTP is requested. At step 530, the user inputs the PIN, the activation code obtained from the provider system for the user's provider account from the enrollment sequence shown in FIG. 3, and, if required, a server URL or other address to access the provider system, or, for example, a provisioning server 50 thereof.

The user device MESC is generated in steps 532 and 535 of FIG. 6. At step 532, the passcode (OTP) application executes a fingerprint code (FPC) to collect information which is unique to user device 20. The fingerprint code (FPC) is preferably a lightweight and portable client with no footprint, such as JavaScript, Flash or pure Java. Any lightweight code, including generic code, could be used for the fingerprint code.

Still referring to FIG. 6, the fingerprint code is executed on the user device 20 and collects information at step 532 from the user device 20, generally using the methods described previously, and transmits the collected information at step 535 to an MESC generator for transformation to a unique machine identifier including a MESC. The MESC generator, which may also be referred to as a machine identifier generator, may be incorporated into the FPC provided to the passcode (OTP) application, such that the transformation of the collected FPC information may be accomplished by the FPC to the user device 20, without the need for, or to access, for example, a separate MESC generator on another server.

At step 540, the OTP application contacts the provisioning server 50 and at step 545 provides the User PIN and MESC to the provisioning server 50. The server 50, at step 550, generates a user specific secret byte array wherein the secret byte array, secret, or key, is defined by or identifiable to the user's provider account. The secret, at step 560, is camouflaged using the PIN and/or MESC and the method as described previously herein for FIG. 2. The secret is modified and the modified secret is encrypted under the user PIN and/or user device MESC, to provide a camouflaged secret.

At step 570, the camouflaged secret is encoded into a single string referred to as a cardstring, or as an OTP cardstring. The OTP cardstring is defined by the camouflaged secret and is thereby identifiable to the user or provider account, and may be further identifiable to the unique user device by using the MESC to camouflage the secret.

At step 580, the server 50 provides the OTP cardstring to the passcode application 26 on the user device 20, where it may be stored, at step 590, in a database or filed system 24 on the user device 20. The passcode application 26 is configured to use the OTP cardstring to generate a user OTP for the provider account.

FIG. 7 shows a process 600 to use the OTP application to obtain a user OTP which is similar to the process 400 of FIG. 5 used to generate an OTP for an EMV Chipcard, and with similar benefits and advantages. The user, at step 602, selects the passcode application 26 on the user device 20 and if required, selects the account or card for which a user OTP is being requested. The user is authenticated to the passcode application 26 at step 605 according to the configuration of the passcode application 26. In a first configuration of the passcode application 26, the user, at step 610, inputs a PIN through the keypad of the user device, which authenticates the user so that the passcode application 26 proceeds to step 630. In a second configuration of the passcode application 26, the passcode application 26 triggers the execution of a FPC at step 625 to generate the user device MESC. The MESC is used to authenticate the user and the passcode application 26 proceeds to step 630. In a third configuration, both steps 610 and 625 are required to authenticate the user before the passcode application 26 will proceed to step 630. At step 630, the passcode application 26 uses the PIN and/or MESC and the camouflaged OTP cardstring to generate a user OTP. At step 635 the ATC is incremented in the user device file system 24.

The user, at step 640, retrieves the OTP from the device 20 and inputs the OTP at step 650 into the secure access system. The secure access system, which may be, for example, a transaction server 40 of the provider system (see FIG. 1), upon receipt of the passcode and, if required, other inputted information or data elements, for example, the user's account number, transaction code, or identification number, increments the ATC in the provider system 10 at step 655. The authentication server 60, at step 665, evaluates the user OTP, which may include regenerating the user OTP independently and comparing the regenerated OTP with the user OTP generated by the passcode application 26 provided by the user device 20. The regenerated OTP provided by the authenticating server 60 may also be referred to as an authenticating OTP. At step 670, and upon successful match or authentication, the provider system authenticates the OTP and grants authorization to the user, for example, to access the secure system or secured data.

Still referring to FIG. 7, also provided is an optional process to further secure access to the system by authenticating the device used to generate the OTP, e.g., the accessing device, to the authenticating server 60. In step 675, after the user has provided the one-time passcode and the PIN, the secure access system executes a fingerprint code (FPC), from a website, provider interface or the authenticating server 60, which may be a third party server, such that the FPC collects information from the device attempting to access the secure system. An MESC is generated for the accessing device and is compared by the authenticating server 60 to the user device MESC provided at step 545 of the activation sequence 50.

Upon successful match of the accessing device MESC to the stored user device MESC at step 680, the authenticating server 60 grants access to the secure system 670. By matching the freshly generated MESC, e.g., the MESC generated from FPC information the accessing device to the stored MESC of the user device, an additional layer of authentication and security is provided. Other configurations are possible. For example, the accessing device may be prompted or challenged to execute the FPC and generate a fresh MESC to be displayed in human readable characters, for input into the secure access system by the accessing user.

In either instance, if the passcode application 26 has been moved to or installed on a non-authorized device, the FPC would collect FPC information unique to the non-authorized device and generate an MESC which would be non-matching to the MESC corresponding to the authorized account holder's user device 20 and stored in or generated by the authenticating server 60. In the case of a non-matching MESC, the transaction or access may be denied or other responsive action taken, which may include, for example, using the information collected by the FPC to identify the intruder or unauthorized intruding device.

The system and method illustrated by FIGS. 6 and 7 provide, rather than an EMV OTP to authorize a payment transaction, an OTP to authenticate a user to a provider network or system, to provide access to secured data, or to authorize a transaction which may be a financial or non-financial transaction, by way of non-limiting example. Other variants of the transaction authorization process shown in FIG. 7 may be used within the method described herein. For example, the passcode application 26, upon receipt of the user PIN and/or MESC and concurrent with a request for an OTP, may contact the server to request a challenge.

The server sends the challenge to the user, by a predetermined process, for example, through an email, as an SMS (short message service) or text message to the user device, or via a phone call or voicemail message. The user retrieves the challenge through appropriate means, and inputs the challenge as a required data element prior to step 630. The OTP generating process may use the challenge in the OTP generating step at 630. Optionally, the user may be required, at step 650, to input a different or additional data element, for example, a secondary PIN or a user identification code for comparison in the authentication process at step 665. Alternatively, the user may input a data element which may be configured as a message to the provider system, for example, an alarm or alert code at 650, notifying the server to terminate all authorization until reactivated, for example, in the event of a stolen user device or a personal security threat to the user.

The user may repeat the enrollment sequence and activation sequence of FIGS. 3 and 6 for more than secured access account or provider account, such that the user may store a plurality of OTP cardstrings for accounts or secured access systems, in the passcode application 26 on user device 20, thus eliminating the need for carrying, for example, multiple OTP generating keyfobs. The passcode application 26 may be provided with a plurality of passcode (OTP) generating algorithms. By way of non-limiting example, the passcode application 26 may be provisioned with multiple passcode generating algorithms configurable to generate OTPs which may be configured as HOTP, TOTP, counter-based or other Internet Engineering Task Force (IETF) standard OTPs.

The passcode application 26 may be provisioned with a plurality of OTP cardstrings, where each of the OTP cardstrings may be configured for each of a plurality of user accounts, e.g., each cardstring may be defined by a specific user account, such that it is generated by a specific camouflaged key or secret. The key or secret associated with each account cardstring may be of a different type. For example, a first cardstring useable to generate a user OTP for a first provider account may be derived from a first secret byte array, and a second cardstring useable to generate a user OTP for a second provider account may be derived from and identifiable to a set of UDKA and UDKB keys defined by an EMV payment card. The first cardstring may be used with a HOTP algorithm, and the second cardstring may be used with an EMV algorithm. A third cardstring may be derived from a second secret byte array, however may use the same HOTP algorithm as the first secret byte array to generate a user OTP for the third provider account. Each of these cardstrings will be associated with a PIN, where the PIN for each may be different, or as selected by the user or otherwise configured, may be the same PIN for additional user convenience.

As described previously, the passcode application 26 on the user device 20 may be provisioned with a plurality of fingerprint codes and/or a plurality of MESC generating algorithms, where each respective one of the FPCs and/or the MESC algorithms may be configured for a respective one or more of a plurality of user accounts. Each respective cardstring will be associated with a PIN, where the PIN for each cardstring may be different, or as selected by the user or otherwise configured, may be the same PIN for additional user convenience.

Similarly, the respective FPC and the respective MESC used to generate each respective account specific cardstring may be different. Alternatively, more than one account specific cardstring may use the same FPC to collect FPC information, and/or may use the same MESC generating algorithm. This may be the case, for example, when the accounts using the same FPC and MESC generating algorithm are of the same type, for example, for multiple secured access systems, where the data elements defining the cardstring for each account, e.g., the system-specific secret or key, differentiate one secure system OTP cardstring from another secure system OTP cardstring.

As described previously, the advantages of the processes described herein are numerous. The ATC can be reset through the passcode application 26 downloaded on the user device 20, by the user manually or through application-server communication enabled by the user device 20, eliminating the inconvenience of replacing the Chipcard in the event of ATC nonsynchrony. The passcode application 26 can be updated automatically and without the need to replace hardware, as may be required with a card reader. The passcode application 26 can be downloaded and activated on multiple user devices for the same PAN or user account.

As an example, for a joint account, the passcode application 26 could be activated on both of the joint cardholder's user devices, which also could be of different types, for example, an iPhone and a Blackberry, to allow each of the joint cardholders to generate OTPs for the joint account. In this instance, the unique MESC provided by each user device can be used to associate each transaction or account access with the particular one of the joint cardholders conducting the transaction or accessing the account. In another example, and in the event of multiple incorrect PIN inputs, resetting of the passcode application 26 can be expedited through a support telephone call and a reset of the passcode application 26 on the user device 20, which can, if necessary, include providing a new cardstring.

Additionally, the processes described herein, using capabilities enabled by cryptographic camouflaging, provide the advantage of intrusion detection. Intrusion detection is not provided by the conventional Visa DPA or MasterCard CAP systems, or by the card reader dependent EMV process, generally, where if the user inputs the incorrect PIN multiple times, the user's Chipcard will lock and become unusable, inconveniencing the user by requiring the user to procure a replacement card. Using the methods and systems described herein, if the user inputs an incorrect PIN and/or provides an incorrect MESC, instead of locking the card, two plausible UDKA and UDKB could be released, such that the intruder might try to employ these in some applications and hence get caught, e.g., the intruder will be detected. As a result, OTP generation using a cardstring derived from a camouflaged key offers a higher level of security against an intruder.

While the above processes are described in detail with respect to transactional systems, including payment systems, and secure access systems, such as enterprise server authentication systems, those skilled in the art will recognize the broader applicability of the claimed invention to securely provide, through a user handheld device such as, for example, an iPhone or Blackberry, an OTP generated from a cryptographically camouflaged datum, where the datum may be of various types, including but not limited to, for example, symmetric keys, non-symmetric keys, secrets, seeds and indexed key lists. Those having ordinary skill in the art will further recognize that terms such as "encrypt," "obfuscate," "key," "PIN," "server," "website," "code," "challenge," etc., are used descriptively of the figures, and do not represent limitations on the scope of the invention where other terms may be used in a generally equivalently descriptive manner.

While the best modes and other embodiments for carrying out the claimed invention have been described in detail, those familiar with the art to which this invention relates will recognize various alternative designs and embodiments for practicing the invention within the scope of this application and the appended claims.

The invention claimed is:

1. A method of generating a user one-time passcode (OTP) for a provider account, the method comprising:
   providing a fingerprint code (FPC) to a user device using a provisioning server;
   collecting FPC information from the user device using the fingerprint code, wherein the FPC information is unique to the user device;
   generating a machine effective speed calibration (MESC) using the FPC information and a MESC generator;
   camouflaging at least one key with a personal identification number (PIN) and the MESC to provide at least one camouflaged key;
   wherein the at least one camouflaged key is defined by the provider account and camouflaged with the personal identification number (PIN) and the (MESC);
   generating a cardstring using the at least one camouflaged key and the provisioning server prior to providing the cardstring to a passcode application, wherein the cardstring is defined by the at least one camouflaged key and configured to generate the OTP for the provider account;
   providing the passcode application to the user device;
   providing the cardstring to the passcode application on the user device;
   storing the cardstring on the user device;

providing the PIN and the MESC to the passcode application;
wherein the passcode application is configured to generate a passcode configured as the user OTP for the provider account using the cardstring and the PIN and the MESC; and
generating the user OTP on the user device using the passcode application and the cardstring on the user device.

2. The method of claim 1, wherein camouflaging the at least one key further comprises:
modifying the at least one key defined by the provider account, to create at least one modified key; and
encrypting the at least one modified key with the PIN and the MESC to create the at least one camouflaged key.

3. The method of claim 1, wherein collecting FPC information from the user device further comprises:
measuring a runtime of one or more iterations of a portion of the fingerprint code on the user device; and
counting a number of iterations completed by a portion of the fingerprint code in a fixed amount of time on the user device.

4. The method of claim 1, wherein generating the MESC further comprises:
determining at least one of:
a time to load a standard picture on the user device; and
a screen resolution corresponding to the standard picture loaded on the user device.

5. The method of claim 1, further comprising:
providing the user OTP to an authenticating server;
generating an authenticating OTP using the authenticating server;
comparing the authenticating OTP and the user OTP; and
providing an authorization result to one of a provider system and the user.

6. The method of claim 5, further comprising:
wherein the provider system is one of a payment system, a transaction system, an authentication system, a secure access system, and a secure data repository; and
wherein the authorization result is one of a payment authorization, a transaction authorization, an authentication authorization, a system access authorization, and a data access authorization.

7. The method of claim 1, further comprising:
providing a data element to the passcode application; and
generating the user OTP on the user device using the data element.

8. The method of claim 7, wherein the data element is a challenge.

9. The method of claim 1, wherein the key is one of a symmetric key, a Data Encryption Standard (DES) key, an Advanced Encryption Standard (AES) key, a secret, a secret byte array, a seed, and a controlled datum.

10. The method of claim 1,
wherein the cardstring is configured as one of an Eurocard, MasterCard and Visa (EMV) cardstring and an OTP cardstring; and
wherein the key is configured as one of a Unique DEA Key A (UDKA), a Unique DEA Key B (UDKB) key, and a secret configured to generate one of a standardized counter-based OTP (HOTP), a time-based OTP (TOTP), and a counter-based OTP.

11. The method of claim 1, further comprising:
providing another cardstring to the passcode application, wherein the passcode application is configured to generate another passcode configured as another user OTP for another provider account using the another cardstring;
wherein the another cardstring is defined by at least another key, wherein the at least another key is camouflaged with another PIN and another MESC;
storing the another cardstring on the user device;
providing the another PIN and the another MESC to the passcode application; and
generating the another user OTP for the another provider account on the user device using the another cardstring stored on the user device.

12. The method of claim 11, further comprising:
providing a plurality of passcode generating algorithms to the passcode application;
providing a plurality of cardstrings to the passcode application;
storing the plurality of cardstrings on the user device;
wherein:
each respective one of the plurality of cardstrings is defined by a respective one of a plurality of provider accounts, and
each respective one of the plurality of cardstrings is defined by at least one respective key that is camouflaged with a respective PIN and a respective MESC;
wherein the passcode application is configured to generate a respective passcode configured as a respective user one time passcode (OTP) for the respective one of the plurality of provider accounts, using one of the plurality of passcode generating algorithms and the respective one of the plurality of cardstrings stored on the user device;
selecting one of the plurality of provider accounts;
providing the respective PIN and the respective MESC for the selected one of the plurality of provider accounts to the passcode application; and
generating the respective user OTP for the selected one of the plurality of provider accounts on the user device using the respective one of the plurality of cardstrings stored on the user device and the respective one of the plurality of passcode generating algorithms.

13. A system for providing a one-time passcode (OTP), for a provider account, the system comprising:
a user device configured to receive a passcode application, a fingerprint code (FPC); a cardstring, and a personal identification number (PIN);
wherein the fingerprint code is configured to collect FPC information from the user device, wherein the FPC information is unique to the user device;
a machine effective speed calibration (MESC) generator configured to generate a MESC using the FPC information; and
a provisioning server configured to provide a cardstring to the user device;
wherein the cardstring is defined by at least one key defined by the provider account and camouflaged with the PIN and the MESC to provide a camouflaged key;
wherein the passcode application is configured to generate a passcode configured as a user OTP for the provider account using the cardstring; and
wherein the cardstring is stored on the user device.

14. The system of claim 3, wherein the fingerprint code is configured to collect FPC information by one of:
measuring a runtime of one or more iterations of a portion of the fingerprint code on the user device; and
counting a number of iterations completed by a portion of the fingerprint code in a fixed amount of time on the user device.

15. The system of claim 13, wherein
the FPC information includes a power supply level collected from a power supply of the user device; and
the MESC is generated using the power supply level.

16. The system of claim 13,
wherein the passcode application is configured to execute at least one passcode generating algorithm;
wherein the at least one passcode generating algorithm is configured to generate one of an Europay, MasterCard, and Visa (EMV) OTP, a standardized counter-based OTP (HOTP), a time-based OTP (TOTP), and a counter-based OTP; and
wherein the passcode application executes the at least one passcode generating algorithm to generate the user OTP for the provider account.

17. The system of claim 13,
wherein the passcode application is configured to receive a data element; and
wherein the passcode application uses the data element to generate the user OTP for the provider account.

18. The system of claim 13, further comprising:
an authenticating server configured to receive the user OTP;
wherein the authenticating server is configured to provide an authenticating OTP and an authorization result to one of a provider system and the user.

19. The system of claim 13, wherein the at least one camouflaged key is configured as a modified key encrypted with the PIN and the MESC; and
wherein the modified key is defined by the provider account, and is configured as one of: a symmetric key, a Data Encryption Standard (DES) key, an Advanced Encryption Standard (AES) key, a secret, a secret byte array, a seed, and a controlled datum.

* * * * *

UNITED STATES PATENT AND TRADEMARK OFFICE
CERTIFICATE OF CORRECTION

PATENT NO.         : 8,533,460 B2                                   Page 1 of 1
APPLICATION NO.    : 12/938666
DATED              : September 10, 2013
INVENTOR(S)        : Geoffrey R. Hird et al.

It is certified that error appears in the above-identified patent and that said Letters Patent is hereby corrected as shown below:

In the Claims

Column 24, Line 61, Claim 14: "claim 3" should be -claim 13-

Signed and Sealed this
Twenty-fifth Day of March, 2014

Michelle K. Lee
*Deputy Director of the United States Patent and Trademark Office*